Feb. 7, 1950     W. M. COX ET AL     2,496,618
COMBINATION WARNING SIGNAL AND TROUBLE LAMP
Filed May 8, 1947
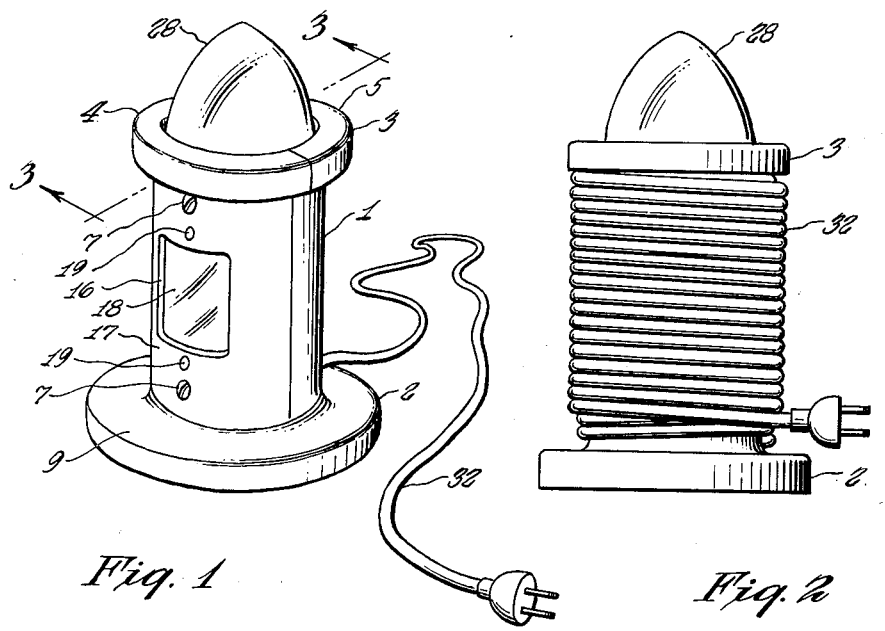
Fig. 1
Fig. 2
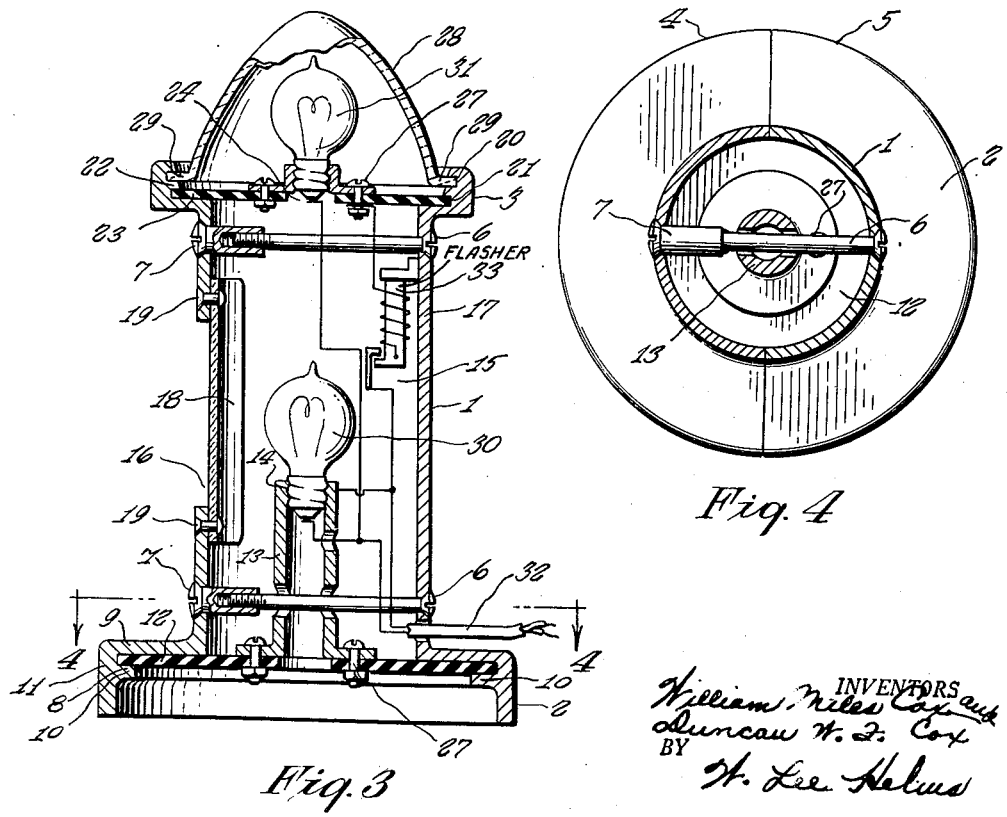
Fig. 3
Fig. 4
INVENTORS
William Niles Cox
Duncan W. T. Cox
BY
H. Lee Helms
ATTORNEY Patented Feb. 7, 1950

2,496,618

UNITED STATES PATENT OFFICE 2,496,618

COMBINATION WARNING SIGNAL AND TROUBLE LAMP

William Miles Cox, Woodside, and Duncan W. F. Cox, Hillside Heights, N. Y.

Application May 8, 1947, Serial No. 746,640

5 Claims. (Cl. 177—329)

This invention relates to a combination safety light and in particular to a safety light which may be used as a trouble light in aiding the operator of a vehicle.

When an automobile breaks down due to motor or tire trouble, it may sometimes be necessary for the operator to make needed repairs on a traveled highway. Such repairs at night are fraught with danger which may be lessened by adequate signal to approaching cars. In addition, said operator requires a portable light which may supply sufficient illumination for repair work.

It is therefore the main object of this invention to provide a combination signal and trouble light that is portable, simple to operate and easily connected to the main battery circuit of any vehicle.

Another object of this invention is to provide a combination signal and trouble light that will furnish a steady beam of light which may be projected in any direction and a flashing colored light which may be seen from any direction.

Still another object of this invention is to provide a combination signal and trouble light device that can be conveniently stored and carried in any automobile or similar vehicle.

Other objects and advantages will appear when considered in connection with the accompanying drawings in which—

Figure 1 is a perspective elevational view of our combination signal and trouble light;

Figure 2 is an elevational view of our combination signal and trouble light showing how the line cord may be wrapped about the lamp for easy portability;

Figure 3 is a longitudinal sectional view of the light shown in Figure 1, taken along the lines 3—3; and Figure 4 is a cross-sectional view of the light shown in Figure 3, taken along the line 4—4.

Referring to the drawings and in particular to the drawing of the combination light shown in Figures 1 and 2, this combination light comprises a hollow casing 1, shaped in the form of a spool in which the circular base flange 2 of said spool shape is larger in diameter than the circular top flange 3. Said casing 1 consists of two halves 4 and 5 which are separatable and may be held together by means of bolts 6 and internally threaded screws 7. One fastening screw 7 and bolt 6 being situated near the top of the light while the other is situated near the base. Said base flange 2 has a peripheral horizontal groove 8 cut therein. One wall of the groove 8 is the top portion 9 of said base flange 2 while the bottom wall of said groove 8 is an internal lip 10 which projects from the vertical wall 11 in said base flange 2. An insulating disc 12, composed of any suitable insulating material, such as Bakelite for example, is adapted to fit within said peripheral groove 8 of said base flange 2. A lamp base 13 made of any suitable conducting material is bolted to the center of said insulating disc 12 so that the internally threaded end 14 of said lamp base 13 projects upward into the cavity 15 of said hollow casing 1. A central section 16 of said cylindrical wall 17 of said hollow casing 1 is cut out to form a window 18 which is covered by any suitable clear transparent material and held in position by means of rivets 19.

Said circular top flange 3 has peripheral horizontal grooves 20 and 21 arranged one above the other in parallel relationship and separated by an internally projecting lip 22. An insulating disc 23 having a centrally located circular aperture 24 is inserted in said lower peripheral groove 21. A circular lamp base 13 having an internally threaded surface 14 is attached to substantially the central portion of said insulating disc 23 by means of bolts 27 so that the channel in said lamp base 25 coincides with the aperture 24 in said insulating disc 23. A dome 28 made of any suitable transparent colored material which should be red preferably encloses the top of said top flange 3. Said dome 28 has flanged edges 29 which are adapted to fit within said upper grooves 20 of said top flange 3 and thus hold said dome 28 in place.

An electric light bulb 30 that provides a steady white light is screwed into the internally threaded end 14 of said lamp base 13 which supports said light bulb 30 in position within said hollow casing 1 so that said light bulb 30 casts a beam through said window 18.

Another light bulb 31 is screwed into the internally threaded surface 26 of said lamp base 25 and is thus supported in position within said dome 28. Said light bulbs 30 and 31 are wired in parallel to outlet wires 32 which may have two test clips or any suitable device for connecting said outlet to the storage battery terminals of the car or any other convenient source of electric power.

Connected in series with one of the wires leading to the signal light bulb 31 is a solenoid 33 or any suitable intermittent on-off switch which causes said signal bulb 31 to flash intermittently as shown in Figure 3.

Figure 4 shows the method of taking the light apart for replacing electric light bulbs. This is accomplished by removing said screws 7 from said bolts 6 and separating the two halves 4 and 5 of said casing 1.

When the lamp is not in use, it may be stored conveniently by wrapping the lead-in cord 32 around the central portion of said casing 1 while the spool flanges 2 and 3 serve as shoulders for keeping said cord 32 from slipping off the casing 1.

In the operation of the device, the lamp is placed on its base 2 and the wire cord 32 unwrapped and connected to a source of current. The light from bulb 30 is so directed as to illuminate the object to be repaired while the intermittent switch operation of the solenoid 33 causes said light bulb 31 to flash within the colored dome 28 and thus warn an approaching automobile of the danger ahead.

As will be seen from the above description, the invention discloses a combination safety light which is portable and is capable of furnishing to an automobile operator sufficient light for night repairs and at the same time supply a flashing danger signal to warn approaching cars that there is a stalled car ahead.

While, in disclosing the principles of our invention and its preferred embodiment, we have described various detailed structures and relationship, it will be understood that such embodiment and details are given by way of example only and not as limiting to the scope of our invention.

Having thus described our invention, what we claim as new and desire to secure by Letters Patent, is as follows:

1. A combination warning signal and trouble lamp, comprising a hollow casing having a central portion and flanges at the upper and lower ends of said central portion, a window situated within said central portion, a transparent dome situated in the upper one of said flanges, a lamp situated within said hollow casing, a lamp situated within said transparent dome means for causing the lamp located within said transparent dome to flash intermittently, said hollow casing being divided in halves and means for holding said hollow casing halves together.

2. A combination warning signal and trouble lamp, comprising a hollow casing divided longitudinally in two halves, said casing being formed in the shape of a spool, one flange of said spool shaped casing being larger than the other, a lamp arranged within said hollow casing, means for supporting said lamp, a window situated in the central wall of said spool shaped casing, a transparent dome situated in the upper of said flanges, a lamp situated within said transparent dome, means for holding said casing halves together, insulating elements adapted to support the lamps and means for cutting off the current supply to said lamp situated within said transparent dome, intermittently.

3. A combination warning signal and trouble lamp as set forth in claim 2 in which said hollow casing has a cylindrical shaped central body, said larger flange being the base of said lamp, a plurality of grooves cut in the flanges and said dome and said insulating elements adapted to fit within the grooves of said flanges.

4. A combination warning signal and trouble lamp, as set forth in claim 2 in which the two lamps are wired in parallel circuits, a current interrupting element situated within the one of said parallel circuits supplying said lamp located within the transparent dome, said parallel circuit being connected by outlet wires to a source of current and said outlet wires being adapted to be wrapped around said spool shaped casing between said flanges when said light is to be transported.

5. A combination warning signal and trouble lamp as set forth in claim 2 in which said dome protrudes above said upper flange in which it is held, said dome having the flashing light therein and means for insulating said lamp from the casing.

WILLIAM MILES COX.
DUNCAN W. F. COX.

REFERENCES CITED

The following references are of record in the file of this patent:

UNITED STATES PATENTS

| Number | Name | Date |
| --- | --- | --- |
| 1,656,648 | Ritz Woller | Jan. 17, 1928 |
| 1,713,052 | Page | May 1, 1929 |
| 2,165,562 | Mack et al. | July 11, 1939 |
| 2,224,742 | Muldoon | Dec. 10, 1940 |